Patented Jan. 11, 1927.

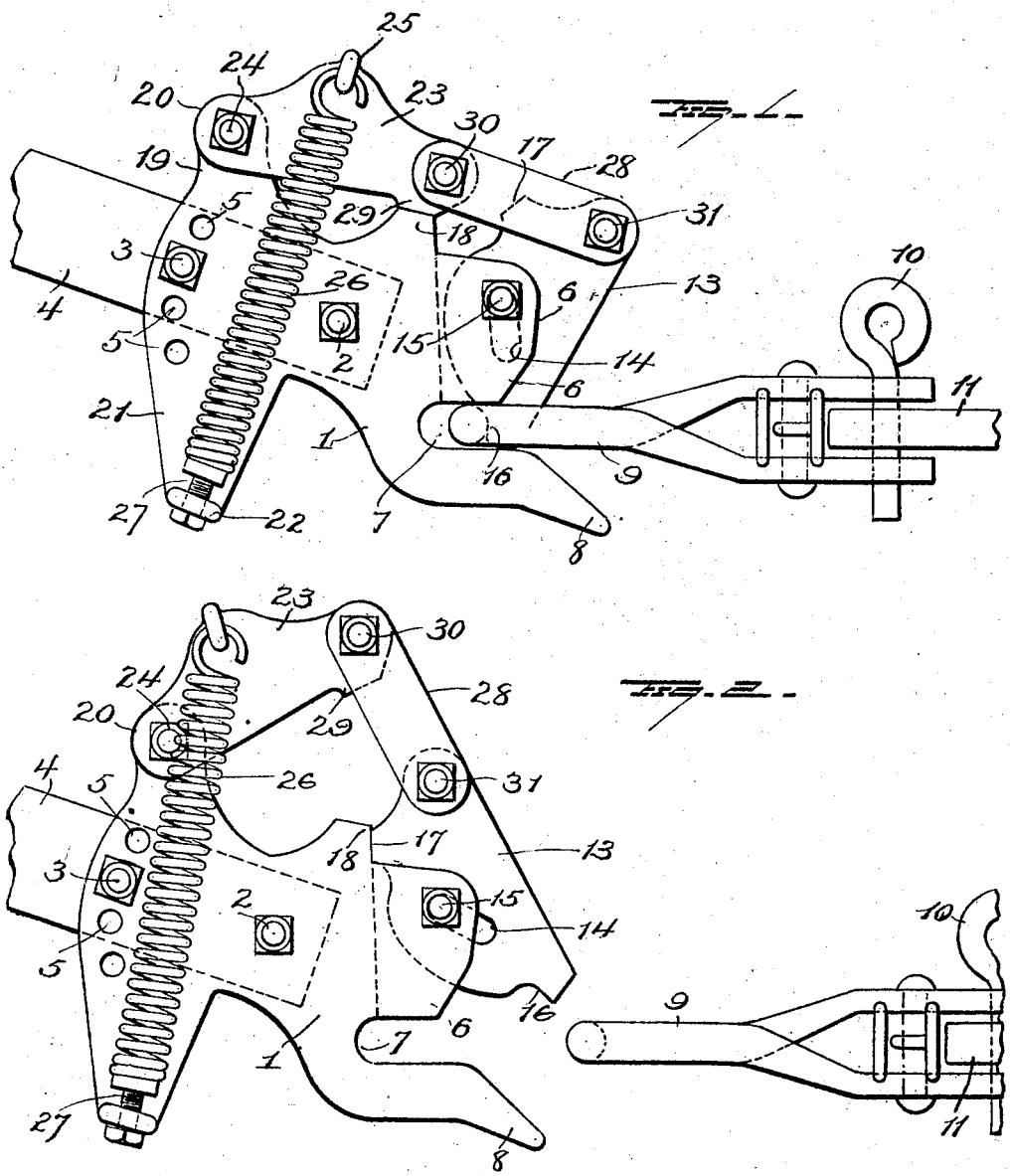

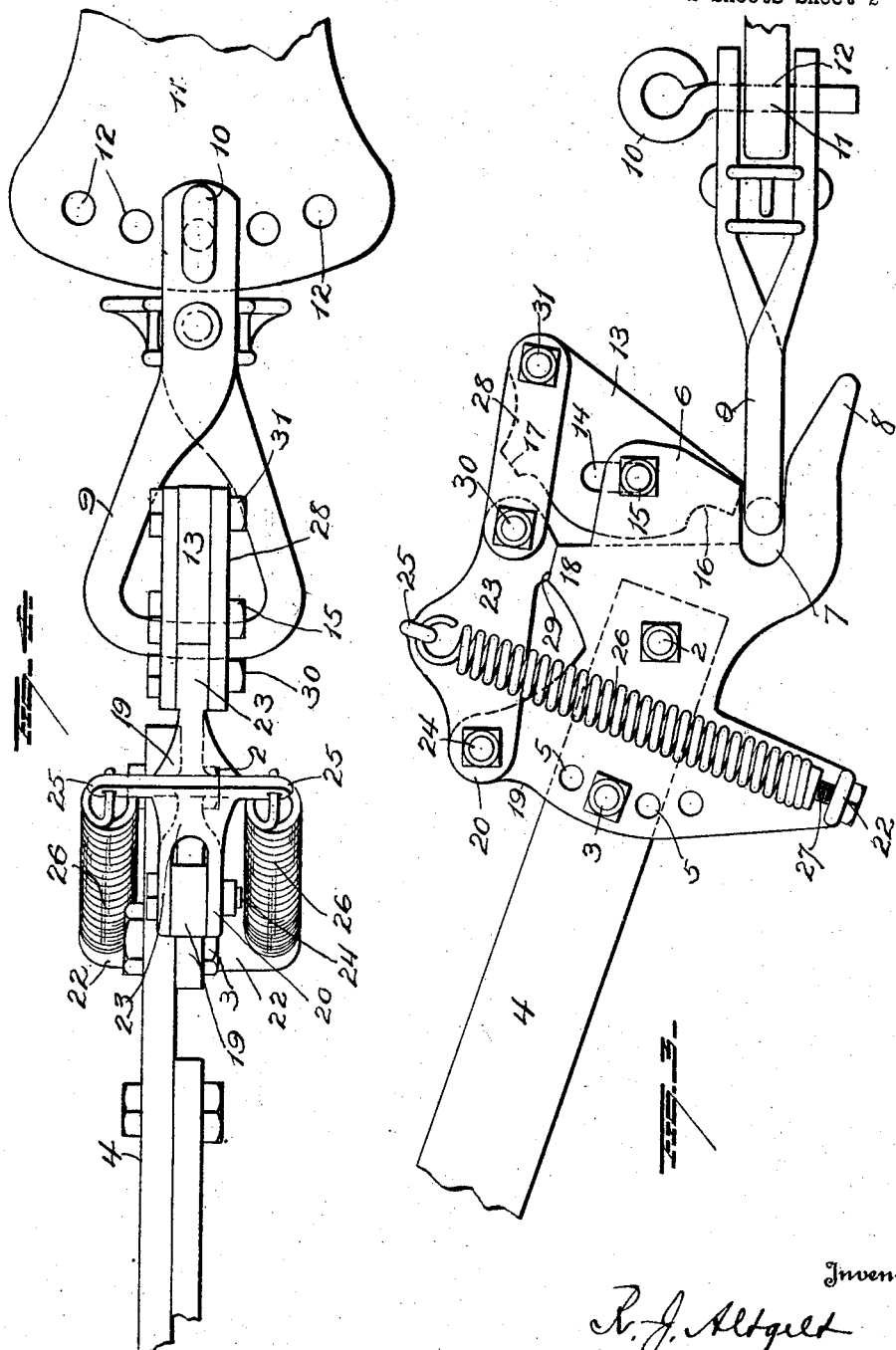

1,613,597

UNITED STATES PATENT OFFICE.

RUDOLPH J. ALTGELT, OF SOUTH BEND, INDIANA, ASSIGNOR TO OLIVER CHILLED PLOW WORKS, OF SOUTH BEND, INDIANA.

HITCH DEVICE.

Application filed May 4, 1925. Serial No. 27,953.

This invention relates to improvements in hitch devices and more particularly to such as are adapted for use in connecting a plow with a tractor,—one object of the invention being to provide an efficient hitch structure which shall be operable automatically to release the plow from the tractor in the event that the progress of the former shall be impeded or blocked by such an obstruction as might result in the straining or breaking of some part of the plow structure,—the structure of said hitch being such, however, that it will not interfere with the efficient operation of the plow in hard ground.

A further object is to so construct an automatically operable release hitch that it may be readily operated by hand to unhitch the plow from the tractor, and also will facilitate the ready automatic hitching of the plow to the tractor or re-hitching the plow to the tractor after an automatic release has occurred.

With these and other objects in view, the invention consists in certain novel features of construction and combinations of parts as hereinafter set forth and pointed out in the claims.

In the accompanying drawings,—

Figure 1 is a view in elevation showing my improved release-hitch, with the parts in normal operative positions.

Figure 2 is a view showing the positions which the parts will assume when the plow meets such an obstruction as will cause the automatic release of the plow from the tractor.

Figure 3 is a view illustrating the position to which the latch member may be moved by hand to unhitch the plow from the tractor, which position may also be assumed in automatic hitching, and Figure 4 is a plan view.

My improvements comprise a main frame or casting 1 which is bolted as at 2, 3, to the front end of a plow, a fragment of which is shown at 4. This main frame or casting may be secured at either side of the plow member 4 and in this manner lateral adjustments of the attachment of the hitch structure to the plow may be effected. The frame 1 is provided with a plurality of holes 5 through any one of which the bolt 3 may be passed and thus vertical adjustment of the hitch devices relatively to the plow may be accomplished.

The forward portion of the frame or casting 1 is bifurcated to provide two arms 6 and below these arms, a jaw 7 is formed, the bottom member of said jaw being made in the form of a finger having a beveled or inclined forward end portion 8 to guide a coupling link or loop 9 into the jaw 7,—said coupling link or loop being connected with the rear portion of a tractor by means of a pin 10 and in the drawings, such rear portion of the tractor is represented in the form of a clevis 11 which is carried by the tractor and provided with a series of holes 12 to permit adjustable connection of the coupling link or loop with the tractor.

Disposed between the arms 6 formed by the bifurcated forward portion of the main frame or casting 1, is a latch member 13 having an elongated slot 14 for the passage of a bolt 15 which also passes through the arms 6 and thus the latch member is connected with the main frame and its lower end is adapted to pass across the opening of the jaw 7 and to be engaged by the coupling link or loop 9, as shown in Figure 1, the seat on the latch member for the coupling link or loop being indicated at 16. The latch member is also provided with a projection 17 to engage the side of an enlargement 18 to limit the opening movement of said latch when the parts assume the positions shown in Figure 2. The rear end portion of the frame 1 is provided with an upward extension 19 terminating in an eye 20 and with a downward extension 21 terminating in a cross-bar 22. The bifurcated rear portion of a link 23 embraces the upward extension 19 and is pivotally connected therewith by means of a bolt 24 passing through said bifurcated portion and through the eye 20 of the upward extension 19. This link is provided upon its top and intermediate of its ends with a cross-bar 25, with the end portions of which the upper ends of springs 26 are connected,—the lower ends of the said springs being adjustably connected with the cross-bar 22 by means of screws 27, the purpose of said screws being to adjust the tension of the springs. The forward end of the link or lever 23 is connected by means of pivoted links 28 with the upper portion of the latch member 13 and the construction is such that the forward portion 29 of the link or lever 23 will rest upon the enlargement 18 of the frame so that, normally, the pivotal connection indicated at 30 between the link or lever 23 and the pivotal connection of the link 28 with the latch member 13 as shown at 31 will bear such relation to each other and to the pivotal connection shown at 24 that said pivotal connection 30 will be slightly above a straight line drawn through the pivotal connections 24 and 31.

With the construction and arrangement of parts above described, the pulling strain will come upon the springs 26, the tension of which may be adjusted as previously explained. When the plow meets an obstruction which it cannot pass without being subjected to undue strain or breakage, the tension of said spring will be overcome and the parts will move to the positions shown in Figure 2, thus releasing the hitch devices on the plow from the coupling link or loop on the tractor and when the plow shall have been thus automatically uncoupled from the tractor, the parts on the plow will immediately resume the positions shown in Figure 1. Should it be desired to release the plow from the tractor by hand, this may be readily accomplished by manually raising the latch member 13 to the position indicated in Figure 3,—such manual operation of the latch member being permitted by reason of the elongated slot 14. After the plow has been automatically released as previously explained and it is desired to again couple the tractor and plow (after the obstruction shall have been passed), this may be accomplished by backing the tractor so that the coupling link or loop will engage the lower end portion of the latch member, forcing it to rise to the position shown in Fig. 3 (due to the provision of the elongated slot in said latch member) and permitting said coupling link or loop to enter the jaw 7, when the latch member will drop behind it, or if desired the latch member may be raised manually to permit such re-hitching.

Having fully described my invention, what I claim as new and desire to secure by Letters Patent, is:

1. In hitch devices, the combination with a frame having a jaw to receive a coupling member, of a latch member pivotally and slidably connected with the frame and having a lower end disposed in front of said jaw, a lever pivoted to the frame and extending longitudinally over the same, springs connected at their upper ends with said lever and at their lower ends with the frame, and a link extending over the frame and pivotally connected with said lever and said latch member.

2. In hitch devices, the combination with a frame having a jaw to receive a coupling member, of a latch member slidably and pivotally connected with the frame and having a lower end disposed in front of said jaw, a lever pivoted to and extending forwardly over the frame, springs connected at their upper ends with said lever and at their lower ends with the frame, a link pivotally connected with said lever and said latch member, and means on the frame and the lever normally retaining the pivotal connection between said lever and link slightly above a straight line passing through the pivotal connections of the lever with the frame and the link with the latch member.

3. In a hitch device, the combination of a frame having a jaw to receive a coupling member, a latch member cooperable with said jaw, said latch member having a substantially vertical slot between its ends, a bolt passing through said slot and connecting the latch member with the frame, a lever pivoted to the frame at one end and adapted at its other end to engage the frame, a link pivoted to the free end of said lever and extending forwardly therefrom over the frame to be pivoted to the upper end of the latch member, and springs connecting said lever with the frame.

4. In a hitch device, the combination of a frame having a jaw to receive a coupling member, a latch member cooperable with said jaw, said latch member having an elongated slot, a bolt passing through said elongated slot and connecting the latch member with the frame, a lever pivoted to the frame at one end and adapted at its other end to engage the frame, a link connecting the free end of said lever with the latch member, and springs connecting said lever with the frame, the engagement of the free end of said lever with the frame normally maintaining the pivotal connection between the lever and link slightly above a straight line passing through the pivotal connection of the lever with the frame and the link with the latch member.

5. In hitch devices, the combination of a frame having a jaw to receive a draft member, a latch pivotally and slidably mounted at the end of the frame to engage the draft device and retain it in the jaw, and a yieldable connection between the latch and the frame normally holding the latch in active position and permitting its release on overloading of the draft member.

6. In hitch devices, the combination of a frame having a jaw to receive a draft device, a latch slidably and pivotally mounted on the frame above the jaw to engage a draft device and hold it in the jaw, links connecting the upper end of the latch with the frame, and a spring connection between the links and the frame tending constantly to aline the links whereby the links may fold upon the occurrence of overload on the draft device to release the latch and realine to automatically return the latch to hitching position after release of the draft device.

7. In hitch devices, the combination of a frame having a jaw to receive a draft device, a latch having a slidable connection at its rear portion with the frame, and a support for the latch overhanging the frame and pivoted to the upper end of the latch, the forward edge of the latch being normally inclined rearwardly and downwardly whereby upon impact from a draft device the latch may rise and then drop into engagement with the draft device to hold said device in the jaw.

In testimony whereof, I have signed this specification.

RUDOLPH J. ALTGELT.